United States Patent [19]

Shea

[11] Patent Number: 5,408,167
[45] Date of Patent: Apr. 18, 1995

[54] SOLAR ENERGY MAGNETIC RESONANCE MOTOR

[76] Inventor: Gerald J. Shea, 5149 Eldredge Ave., Terre Haute, Ind. 47802-8597

[21] Appl. No.: 193,212

[22] Filed: Feb. 8, 1994

[51] Int. Cl.[6] ............................................. F03G 6/00
[52] U.S. Cl. .................................... 318/558; 310/273
[58] Field of Search ...................... 318/538, 542, 558;
                                    310/66, 273; 136/243, 291; 416/3

[56] References Cited

U.S. PATENT DOCUMENTS 4,634,343  1/1987  Nakamats .
4,670,622  6/1987  Livingston, Jr. .
4,714,797 12/1987  Nagai .

Primary Examiner—Bentsu Ro
Attorney, Agent, or Firm—H. John Barnett

[57] ABSTRACT

A photovoltaic cell-driven motor, more particularly, a special magnetic resonance enhanced, synchronously shaded motor driven by solar energy. A shading vane rotates on the motor shaft, and alternately shades the photovoltaic cells from the solar energy light rays. A stationary magnet is disposed just outside the electric coil on the motor shaft, and is synchronized with the shading vane to rotate the motor shaft in one direction. The motor converts direct current to alternating current electrical power, and is particularly useful in situations where constant sunlight is available, such as on a space station or a lunar station.

6 Claims, 1 Drawing Sheet

SOLAR ENERGY MAGNETIC RESONANCE MOTOR

BACKGROUND OF THE INVENTION

1. Field of the Invention

This invention relates to a photvoltaic cell-driven motor, and, more particularly, to a special magnetic resonance enhanced, synchronously shaded motor driven by solar energy. The motor converts direct current to alternating current electrical power, and is particularly useful in situations where constant sunlight is available, such as on a space station or a lunar station.

2. Description of the Prior Art

The following patents relate to solar energy powered devices for use in space, or on the earth where a high percentage of sunlight hours are available:

| Patent | Inventor | Date |
|---|---|---|
| 4,217,633 | Evans | 1980 |
| 4,404,472 | Steigerwald | 1983 |
| 4,577,052 | Schutten et al | 1986 |
| 4,728,878 | Anthony | 1988 |
| 4,781,018 | Shoji | 1988 |
| 4,910,963 | Vanzo | 1990 |
| 4,982,569 | Bronicki | 1991 |
| 5,005,360 | McMurtry | 1991 |
| 5,103,646 | Fini | 1992 |
| 5,123,247 | Nelson | 1992 |
| Japanese Patents | | |
| 53-32246 | Nishioka | 1976 |
| 56-75915 | Yamamoto et al | 1979 |
| 60-43156 | Hisanori | 1985 |
| German Patent 2,756,636 | Genswein A | 1979 |

The most pertinent of the above patents appear to be: Steigerwald 4,404,472; Schutten et al 4,5777,052; Anthony 4,728,878; Japanese 53-322246 and 56-75915.

Steigerwald 4,404,472 discloses an analog and a digital control for a dc to ac inverter to supply sinusoidal current to a utility while drawing maximum power from a solar array. Schutten et al 4,577,052 is directed to an AC solar cell which includes a pivoted mirror which alternately directs light energy to one of two PN junctions to produce an alternating current without a DC to AC converter. A second embodiment of Schutten et al employs stationary split mirrors with changeable transparency means controlled by an AC source.

Anthony 4,728,878 also avoids the use of a DC to AC converter by means of rotating shutters controlled by an external reference. Japanese 53-32246 discloses a rotary shaft on which are mounted a plurality of vanes, each having a thermal light absorbing surface and a thermal light ray reflecting surface. The device rotates when exposed to thermal light rays to generate a direct current, apparently. None of the above references disclose the concept of generating mechanical energy and alternating current electrical energy from solar energy employing a combination of magnetic resonance and synchronous pulses of solar energy supplied to an electric coil rotating in the field of a permanent magnet.

SUMMARY OF THE INVENTION

This invention provides a simple magnetic resonance motor for deriving alternating current energy and mechanical energy directly from a light source, such as solar light. A pair of photovoltaic cells are connected in circuit with a rotating shaft which supports an electric coil disposed between the north and south poles of a permanent magnet.

The rotating shaft extends axially beyond the photocells, and a shading vane is mounted on the shaft exteriorly of the photocells, and rotates with the shaft to alternately shade each photocell to cause the current flow to the rotating electric coil to alternate in synchronous harmony with the magnetic torque. The combined effects of the photocells and the magnetic torque cause the motor shaft to rotate continuously and smoothly to supply mechanical energy to a suitable load, or to perform as an alternating current generator for suitable electrical devices. As long as light, such as solar energy, is supplied to the photocells, the motor will continue to rotate until the bearings wear out.

DETAILED DESCRIPTION OF THE INVENTION

Figure 1:
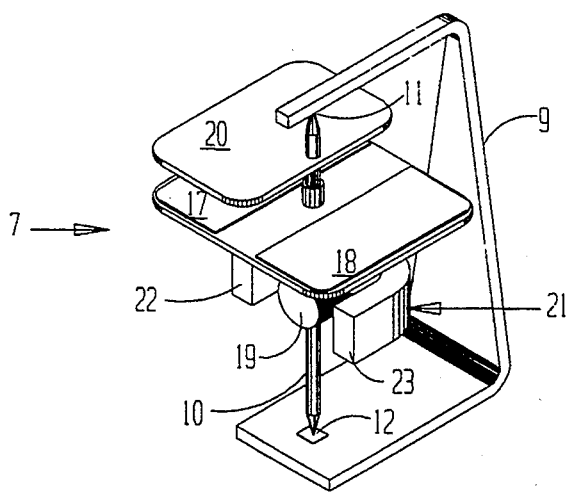
FIG. 1 of the drawing is a schematic perspective view of the AC, solar energy driven motor of the invention with the wiring omitted.
Figure 2:
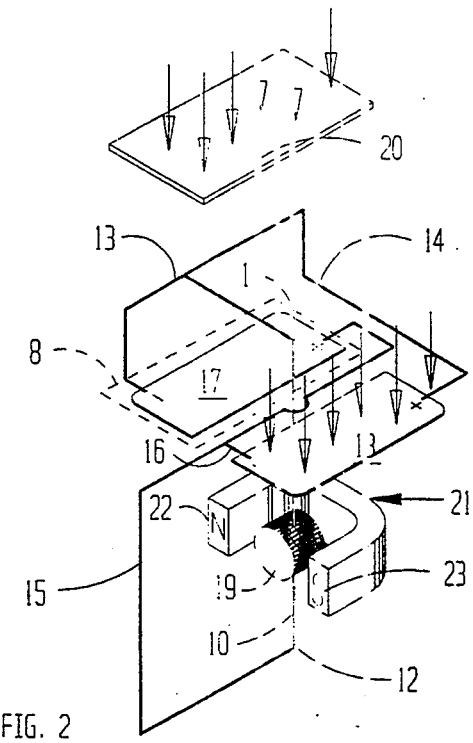
FIG. 2 is a schematic perspective view of the motor of FIG. 1 with some parts omitted, but including the wiring, and showing the shutter vane shading one photocell.

As shown in FIG. 1, a solar energy driven, magnetic resonance, AC motor 7 comprises an electrically conductive motor shaft 10, which is rotatably mounted on electrically conductive bearings 11 and 12 which are supported on a non-conducting frame 9. Bearings 11 and 12 are electrically connected in circuit by electrical conductors 13, 14, 15 and 16 to a pair of photovoltaic cells 17 and 18, as shown in FIG. 2.

The shaft 10 supports electric coil 19, which is electrically energized through shaft 10 when photovoltaic cells 17 and 18 are exposed to a source of light, preferably direct sunlight. Shaft 10 also supports a shutter vane 20 which also rotates with shaft 10 to alternately shade the photovoltaic cells 17 and 18 from the light source (shown by arrows), thus providing alternating current to the electric coil 19. It was discovered, however, that the shaft 10 tended to oscillate, instead of rotate, because the current generated at the photovoltaic cells 17 and 18 is substantially equal.

A permanent magnet 21 having a north pole 22 and a south pole 23 is disposed around electric coil 19. The exact position of the magnet 21 relative to the coil 19 and the vane 20 is determined to provide the optimum torque to shaft 10 when the photovoltaic cells 17 and 18 are alternately exposed to a light source, such as solar energy. The magnetic torque on coil 19 is sufficient to establish rotation of shaft 10 in one direction, and the bursts of alternating current from the photovoltaic cells 17 and 18 keeps the shaft 10 rotating in one direction at a constant rpm.

The combined effect of alternately pulsating light energy to the photovoltaic cells 17 and 18 by means of the shutter vane 20, and the magnetic torque of the magnet 21 on the electric coil 19 provide a simple alternating current machine from a direct current energy source without the need for a power converter.

Figure 3:
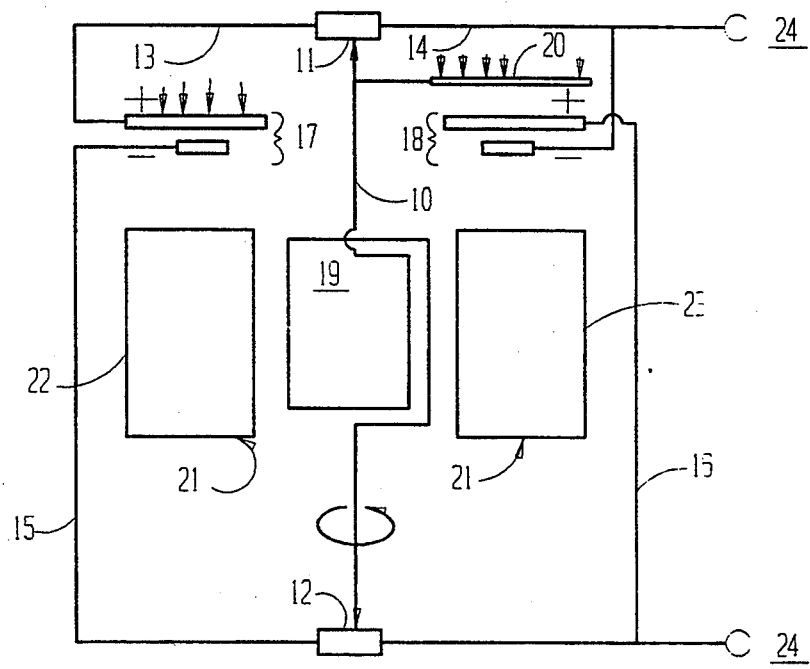
FIG. 3 is a diagramatic sectional view of the motor shown in FIG. 2 showing the electric circuit, and the relationship of the permanent magnet to the electric coil.

The solar energy motor 7 of the invention can be used to power alternating current devices by placing a load 24 in the circuit as shown in FIG. 3. The size of the load 24 (AC device) is limited by the size and output of the motor 7.

A plurality of the solar energy driven, magnetic resonance, AC motors of the invention can be assembled in series or parallel circuits to increase the total AC power generated. Each shutter vane 20 is synchronized with each other shutter vane 20 so that the power output of the circuit is additive.

Proximity to the light source determines efficiency and power output of the electric coil 19 on shaft 10. It is believed that the subject invention will have excellent applications on space stations, and on the earth's moon.

What is claimed is:

1. An alternating current motor adapted to be driven by light energy comprising:

an electrically conducting shaft having first and second ends and an intermediate portion;

first and second electrically conductive bearings rotatably supporting the corresponding first and second ends of the shaft;

an electric coil disposed on the intermediate portion of the shaft, and adapted to rotate with the shaft;

a pair of stationary photovoltaic cells radially disposed at opposite sides of the shaft, each photovoltaic cell having a light receiving surface which is perpendicular to the shaft axis and facing away from the electric coil;

shading means mounted on the shaft for alternately cutting off light energy from the first and second photovoltaic cells so that the shaft and the electric coil are alternately and synchronously driven by the first and second photovoltaic cells; and stationary permanent magnet means disposed in close proximity to the rotatable electric coil to maintain optimum rotation of the electrical coil by providing additional magnetic torque when the photovoltaic cells are receiving the light energy.

2. The alternating current motor of claim 1, in which the light energy is solar energy.

3. The alternating current motor of claim 1, in which the photovoltaic cells are adapted for solar energy collection.

4. The alternating current motor of claim 3, in which the shading means comprises a rotatable vane, wherein the rotatable vane and the permanent magnet are positioned relative to the electric coil to obtain optimum power output.

5. The alternating current motor of claim 4 in combination with a plurality of identical motors disposed in a series circuit to increase the total power output.

6. The alternating current motor of claim 4 in combination with a plurality of identical motors disposed in a parallel circuit to increase the total power output.

* * * * *